US011159113B2

(12) United States Patent
Zhou et al.

(10) Patent No.: US 11,159,113 B2
(45) Date of Patent: Oct. 26, 2021

(54) FAULT-TOLERANT DIRECT THRUST-FORCE CONTROL METHOD FOR FIVE-PHASE PERMANENT-MAGNET LINEAR MOTOR WITH ONE OPEN-CIRCUIT PHASE FAULT

(71) Applicant: JIANGSU UNIVERSITY, Zhenjiang (CN)

(72) Inventors: Huawei Zhou, Zhenjiang (CN); Cheng Zhou, Zhenjiang (CN); Guohai Liu, Zhenjiang (CN); Duo Zhang, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 0 days.

(21) Appl. No.: 17/043,705

(22) PCT Filed: Jan. 31, 2018

(86) PCT No.: PCT/CN2018/074639
§ 371 (c)(1),
(2) Date: Sep. 30, 2020

(87) PCT Pub. No.: WO2019/136784
PCT Pub. Date: Jul. 18, 2019

(65) Prior Publication Data
US 2021/0067077 A1    Mar. 4, 2021

(30) Foreign Application Priority Data

Jan. 11, 2018 (CN) .......................... 201810025607.3

(51) Int. Cl.
*H02P 21/30* (2016.01)
*H02P 23/30* (2016.01)
(Continued)

(52) U.S. Cl.
CPC .............. *H02P 21/30* (2016.02); *H02P 6/006* (2013.01); *H02P 21/141* (2013.01); *H02P 23/30* (2016.02);
(Continued)

(58) Field of Classification Search
CPC ...... H02P 21/30; H02P 23/30; H02P 29/0243; H02P 29/032; H02P 6/006; H02P 21/141;
(Continued)

(56) References Cited

U.S. PATENT DOCUMENTS

2012/0074879 A1*  3/2012  Fahimi ................. H02P 21/141
                                                318/400.04
2013/0249324 A1*  9/2013  Gandhi ................ H02K 41/033
                                                310/12.18

FOREIGN PATENT DOCUMENTS

CN      104184380 A      12/2014
CN      106059442 A      10/2016
(Continued)

OTHER PUBLICATIONS

Mario Bermudez Guzman et al., Open-Phase Fault-Tolerant Direct Torque Control Technique for Five-Phase Induction Motor Drives, Transactions on Industrial Electronics, 2017, pp. 902-911, 64(2).

*Primary Examiner* — Zoheb S Imtiaz
(74) *Attorney, Agent, or Firm* — Bayramoglu Law Offices LLC

(57) ABSTRACT

In the fault-tolerant direct thrust-force control (FT-DTC) method, the generalized Clarke transform matrix and its inverse matrix are derived according to the fault-tolerant phase currents. The stator fluxes in α-β plane are deduced based on these. Based on the requirement of circular stator flux trajectory, virtual stator fluxes are defined, and then compensatory voltages in the α-β plane are obtained. Actual stator voltages in the α-β plane are calculated by modulation function of voltage source inverter. Combining with the
(Continued)

compensatory voltages, the actual stator voltages and the stator currents, the virtual stator fluxes and the thrust-force are estimated by the flux and thrust-force observers. The thrust-force reference, the stator flux amplitude reference, the observed thrust-force and virtual stator flux are applied to predict virtual stator voltage references. The actual stator voltage references is calculated according to virtual voltage references and compensatory voltages, and are fed to voltage source inverter.

8 Claims, 14 Drawing Sheets

(51) Int. Cl.
*H02P 29/024* (2016.01)
*H02P 29/032* (2016.01)
*H02P 6/00* (2016.01)
*H02P 21/14* (2016.01)
*H02P 25/06* (2016.01)
*H02P 25/22* (2006.01)
*H02P 27/06* (2006.01)
*H02P 29/028* (2016.01)

(52) U.S. Cl.
CPC .............. *H02P 25/06* (2013.01); *H02P 25/22* (2013.01); *H02P 27/06* (2013.01); *H02P 29/028* (2013.01); *H02P 29/0243* (2016.02); *H02P 29/032* (2016.02)

(58) Field of Classification Search
CPC .......... H02P 25/06; H02P 25/22; H02P 27/06; H02P 29/028
See application file for complete search history.

(56) References Cited

FOREIGN PATENT DOCUMENTS

| | | |
|---|---|---|
| CN | 106100495 A | 11/2016 |
| CN | 107134964 A | 9/2017 |
| CN | 107565865 A | 1/2018 |
| WO | 2017143434 A1 | 8/2017 |

* cited by examiner

FAULT-TOLERANT DIRECT THRUST-FORCE CONTROL METHOD FOR FIVE-PHASE PERMANENT-MAGNET LINEAR MOTOR WITH ONE OPEN-CIRCUIT PHASE FAULT

CROSS REFERENCE TO THE RELATED APPLICATION

This application is the national stage entry of International Application No. PCT/CN2018/074639, filed on Jan. 31, 2018, which is based upon and claims priority to Chinese Patent Application No. 201810025607.3, filed on Jan. 11, 2018, the entire contents of which are incorporated herein by reference.

TECHNICAL FIELD

The invention relates to a fault-tolerant direct thrust-force control (FT-DTC) method for a linear motor under one-phase open-circuit fault condition, especially to a FT-DTC method for a five-phase permanent-magnet linear motor (PMLM) with an open-circuit fault. It is suitable for aerospace, electric vehicles and so on, which have strict requirements on reliability and dynamic performance.

BACKGROUND

With the improvement of science, technology and living standards, people are requiring more from transportation, especially safety, reliability and comfort of driving. The performance of a suspension system is of great significance for vehicle driving performance, so researches on steady and dynamic performance of active suspension systems have received more and more attention. The tubular linear motor is a key component for active suspension system. The steady and dynamic performance of a tubular linear motor with a fault is directly related to the reliability of electromagnetic suspension and the capability of disturbance-free operation.

When a motor has a one phase open-circuit fault, although it can still output certain thrust/torque and speed, it results in deteriorated phase currents, and fluctuations of thrust/torque and speed when compared to those in healthy operation. Meanwhile, the noise and loss become larger, which will deteriorate operational performance and decrease service life, and even cause irreparable damage to main components of the motor drive. When an open-circuit fault occurs, it is possible to ensure the motor reaches the same steady and dynamic performance of healthy operation if the suitable fault-tolerant algorithm is injected in time. For example, the fluctuations of thrust/torque and speed in fault operation can be significantly reduced. The application number of a Chinese patent is 201410477291.3—"Fault-tolerant torque control method for six-phase permanent-magnet synchronous motor with biased-60-degree under one-phase loss". It presented a fault-tolerant direct torque control (FT-DTC) method for a six-phase permanent-magnet synchronous motor with a one-phase open-circuit fault, which is the improved method of traditional direct torque control (DTC). Virtual voltage sector and zero-sequence subspace are divided into 36 and 46 sectors respectively, where the appropriate switching vector is selected to realize FT-DTC operation. However, the complexity of control algorithm was increased. Particularly, sector division is related to trigonometric functions and irrational numbers, which increases control error and affects FT-DTC performance. Meanwhile, hysteresis control is used to control the flux amplitude and torque, which also caused problems such as error and difficulty of regulation. The paper "Open-phase fault-tolerant direct torque control technique for five-phase induction motor drives, *IEEE Transactions on Industrial Electronics* 64(2): 902-911, 2017" proposed a FT-DTC method for a five-phase induction motor with a one-phase open-circuit fault. When a one-phase open-circuit fault occurs, the motor drive has large control error and noise, disordered switching frequency and deteriorative dynamic performance due to hysteresis control. Meanwhile, according to the stator flux and the output of two hysteresis comparators, the suitable sector and switching vector are selected, which causes complex fault-tolerant control algorithm and low control precision. In addition, current in the zero-sequence space is not controlled to zero, which results in increasing loss, large ripples of torque and phase currents. At present, the main idea of the FT-DTC method for a multi-phase motor with a one-phase open-circuit fault is that components of stator currents in the two-phase stationary frame are obtained by a traditional transformation matrix, and voltage components in the two-phase stationary frame are obtained according to the switching state, and then electromagnetic torque, stator flux and its angle are observed. Finally, FT-DTC operation is achieved by selecting a suitable switching vector based on hysteresis comparators and a switching table. However, due to adoption of the hysteresis comparators and switching table, it results in unequal phase current amplitudes, large switching frequencies, existing zero-sequence space currents, large noise and loss, and deteriorated steady and dynamic performance. Therefore, this method is not suitable for applications with strict requirements on steady and dynamic performance. Moreover, most FT-DTCs are employed for multi-phase induction/permanent-magnet rotating machines, and there is no FT-DTC method for a five-phase PMLM.

SUMMARY

It is aimed at shortcomings of the existing fault-tolerant control technology, and characteristics of a five-phase PMLM and its open-circuit fault. The goal of invention is to overcome disadvantages of existing fault-tolerant control strategy when a five-phase linear motor has a one-phase open-circuit fault, such as an unequal phase current amplitude, large thrust-force/torque ripples, variable inverter switching frequency, low control accuracy, severe noise, poor dynamic performance and so on, caused by a traditional Clarke transform matrix, hysteresis comparators and switching tables. The invention can not only achieve high fault-tolerant performance, high dynamic performance, excellent tracking performance of thrust-force and speed when the motor drive has a one-phase open-circuit fault, but can also reduce the control algorithm's complexity and CPU's cost. Meanwhile, it can achieve a constant inverter switching frequency, equal phase current amplitude, low noise, and simplified EMC design. Finally, high reliability, high steady-state and dynamic performance of a five-phase PMLM with an open-circuit fault can be achieved.

The control object of the invention is the five-phase PMLM, whose five phase are defined as phase-A, phase-B, phase-C, phase-D and phase-E, respectively. When the motor has an open-circuit fault, the FT-DTC method includes the following steps:

(12) A five-phase PMLM model is established.

(13) When an open-circuit fault occurs in phase-A, according to the principle that Magneto-motive Force (MMF) of stator windings keeps constant both in healthy and fault operation, the constraint that the sum of remaining healthy phase currents is zero, and the constraint that the amplitudes of remaining healthy phase currents should be equal, the fault-tolerant currents $i_B$, $i_C$, $i_D$, $i_E$ in the remaining healthy phases are deduced. Based on the obtained results, the generalized Clarke transform matrix $T_{4s/2s}$ and its inverse transform matrix $T_{2s/4s}$ are derived under open-circuit fault conditions, where $T_{4s/2s}$ is adopted to transform variations from the natural frame into the two-phase stationary frame named as α-β plane.

(14) According to the relationship between stator flux and permanent-magnet flux: $\psi_s = L_s i_s + \psi_f$, $T_{4s/2s}$ is applied to transform stator fluxes $\psi_B$, $\psi_C$, $\psi_D$, $\psi_E$ to the stator fluxes in the α-β plane and $\psi_z$ in the zero-sequence subspace.

(15) Based on the principle that trajectory of the stator flux vector and MMF vector are circular in the α-β plane under fault-tolerant operation, virtual stator flux $\psi_{xs}$ in the α-β plane is defined according to the Step 3.

(16) The relationship between actual and virtual stator voltages in the α-β plane is derived by $T_{4s/2s}$ and $\psi_{xs}$:

$$\begin{bmatrix} u_{x\alpha} \\ u_{x\beta} \end{bmatrix} = \begin{bmatrix} u_\alpha \\ u_\beta \end{bmatrix} + \lambda_m \omega \begin{bmatrix} -0.5\sin\theta \\ 0.053\cos\theta \end{bmatrix}$$

(17) In order to keep a circular trajectory of stator flux vector and MMF vector under open-circuit fault conditions, the stator compensatory voltages $u_{comp\alpha}$, $u_{comp\beta}$ in the α-β plane are defined based on Step 5.

(18) $T_{4s/2s}$ is employed to transform the remaining healthy phase currents $i_B$, $i_C$, $i_D$, $i_E$ to the currents $i_\alpha$, $i_\beta$ in the α-β plane and the current $i_z$ in the zero-sequence subspace. Based on these, the observers of flux and thrust-force are designed to estimate the amplitude of virtual stator flux $\psi_{xs}$, the virtual stator flux angle $\theta_s$ and the thrust-force $F_e$. Meanwhile, a Proportional Integral (PI) controller is adopted to control $i_z$ to zero, whose output is the zero-sequence voltage reference $u^*_z$.

(19) The difference between the thrust-force reference $F^*_e$ and the estimated thrust-force $F_e$ is used to obtain the thrust-force incremental angle $\Delta\delta$ by a PI regulator. Then, the differences $\Delta\psi_{x\alpha}$, $\Delta\psi_{x\beta}$ between the flux references and the estimated virtual stator fluxes in the α-β plane are achieved according to the observed virtual stator flux amplitude $\psi_{xs}$, the flux reference $\psi^*_s$ and the virtual stator flux angle $\theta_s$.

(20) The virtual stator voltages are defined as:

$$\begin{bmatrix} u_{x\alpha} \\ u_{x\beta} \end{bmatrix} = R\begin{bmatrix} i_\alpha \\ i_\beta \end{bmatrix} + \frac{d}{dt}\begin{bmatrix} \psi_{x\alpha} \\ \psi_{x\beta} \end{bmatrix},$$

then the virtual stator voltage references $u^*_{x\alpha}$, $u^*_{x\beta}$ are deduced in the α-β plane.

(21) According to step 6, the actual stator voltage references $u^*_\alpha$, $u^*_\beta$ in fault-tolerant operation are obtained.

(22) $T_{2s/4s}$ is adopted to transform the actual voltage references $u^*_\alpha$, $u^*_\beta$, $u^*_z$ obtained from step (7) and (10) to the phase voltage references $u^*_B$, $u^*_C$, $u^*_D$, $u^*_E$ in the natural fame. Since phase-A is open-circuit, the voltage reference of phase-A is defined as $u^*_A = 0$.

(12) Combining with voltage source inverter and the CPWM method, the phase voltage references $u^*_A$, $u^*_B$, $u^*_C$, $u^*_D$, $u^*_E$ obtained from step (11) are employed to realize disturbance-free operation of the five-phase PMLM with an open-circuit fault.

The invention has the following beneficial effects:

8. The proposed FT-DTC method in the present invention is quite different from traditional FT-DTC, which adopts a hysteresis comparator to select a voltage vector in a switching table. The traditional FT-DTC method brings voltage error. Additionally, the switching table query and sector selection and sector division, calculation on trigonometric function and irrational function greatly increase complexity and results in large thrust-force ripples. The FT-DTC method in the present invention adopts the CPWM method based on zero-sequence voltage signal injection, which has the same effect as the space vector pulse width modulation (SVPWM), then the proposed method can be achieved without sector selection and complex calculations. Meanwhile, CPU cost is saved, in which calculation time is effectively reduced, and pulsating thrust-force is greatly restrained.

9. The combination of the generalized Clarke transformation matrix and FT-DTC strategy proposed in the present invention realizes that the amplitude of currents in α-β plane is equal and the angle between them is 90 degrees in open-circuit fault operation, i.e., the trajectory of the current vector in the α-β plane is circular. At the same time, currents in zero-sequence space are extracted, then they can be restrained to improve the quality of the sinusoidal waveform of phase currents and reduce copper and core loss using a simple PI controller, and it is no longer needed to set a special voltage vector to suppress zero-sequence current as in the traditional FT-DTC method.

10. The generalized Clarke transform matrix and stator compensatory voltages in the present invention not only realize circular trajectories of the virtual stator flux vector and MMF vector in the α-β plane, but also achieve fault-tolerant direct thrust-force control.

11. The combination of virtual stator flux and direct thrust-force control (DTC) based on a space vector in the present invention effectively avoids a too large and complex voltage vector switching table of the traditional FT-DTC. The voltage vector can be obtained accurately, and then a CPWM strategy can be employed to achieve precise modulation. Thus, sinusoidal waveforms of phase currents are improved, thrust-force pulsations are effectively suppressed, steady-state performance is improved, and vibration and noise are restrained.

12. The amplitude of the virtual stator flux obtained by the flux observer is equal to the stator flux amplitude in healthy operation, which ensures consistency of stator fluxes and thrust-force both in healthy and fault operation.

13. Virtual voltages in the present invention are reconstructed to compensate stator voltages when a phase-A open-circuit fault occurs, then it is capable of keeping sinusoidal stator currents, equal amplitude of stator currents, 90 degree phase difference between the two current phasors in the α-β plane, and circular trajectories of the stator flux vector and the MMF vector are also achieved without reconstructing virtual stator currents, virtual flux and so on in the α-β plane; when an open-circuit fault occurs, this method can effectively switch from healthy operation to fault-tolerant operation without disturbance. Compared to fault operation, it effectively reduces thrust-force ripples and distortion of the phase currents. The proposed control method in the present invention adopts voltage vectors produced by the remaining healthy phases to realize instantaneous control of thrust-force in the α-β plane, hence possessing excellent dynamic response and accurate following performance.

14. The generalized Clarke transform matrix in the present invention is used to transform the variations in remaining healthy phases into the two-phase stationary frame (α-β), compensatory voltages are employed to realize circular stator flux trajectory. These create a precondition for FT-DTC disturbance-free operation under open-circuit fault condition. On the other hand, zero-sequence current is controlled to zero to reduce copper and core loss, to increase efficiency and to restrain fluctuations of thrust-force. Combining with the generalized Clarke transform matrix, its inverse matrix, the CPWM method based on zero-sequence voltage injection, compensatory voltages in the two-phase stationary frame, reconstruction of virtual stator voltages, the observers of virtual stator flux and thrust-force, the proposed FT-DTC strategy can not only realize DTC disturbance-free operation under an open-circuit fault condition, but also increase utilization of inverter bus voltage. Meanwhile, it avoids the complexity of the traditional SVPWM algorithm. The invention also adopts the CPWM method, which is a clear and concise way to highlight simple and effective characteristics of DTC. Additionally, the proposed FT-DTC method in the present invention can also improve the tracking performance of thrust-force, dynamic and steady-state performance under an open-circuit fault condition, so that dynamic and steady-state performance are almost the same as that in healthy operation.

In the figures: 1 represents a stator, 2 represents a mover, 3 represents an armature tooth, 4 represents fault-tolerant teeth, 5 represents a coil winding, 6 represents a permanent magnet, and 7 represents magnetic material.

DETAILED DESCRIPTION OF THE EMBODIMENTS

In order to more simply and clearly illustrate the structural characteristics and beneficial effects of the FT-DTC method for a five-phase PMLM in the present invention, a five-phase fault-tolerant PMLM is described in the following.

Figure 1:
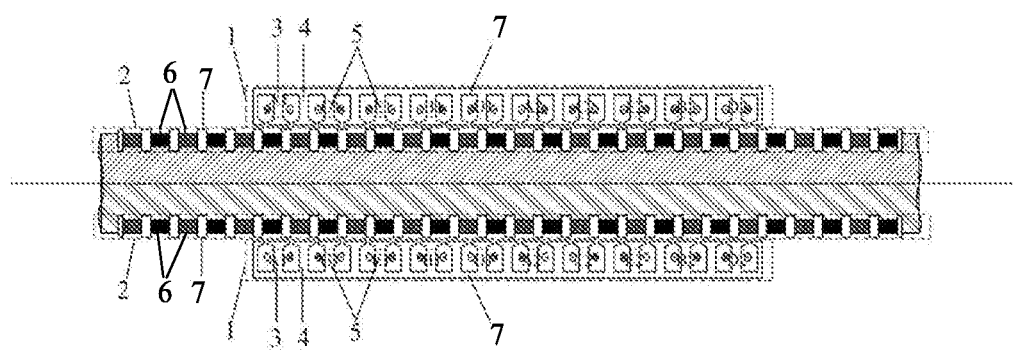
FIG. 1 shows the schematic diagram of a five-phase fault-tolerant PMLM.

FIG. 1 shows the topology of the five-phase permanent-magnet fault-tolerant tubular linear motor in the present invention. The windings are placed in the stator. The permanent magnets are located on the mover, and each permanent magnet mounted on the mover in the form of a spoke is isolated by a magnetically permeable material. Then, it can generate a large thrust-force and a small detent force. The fractional-slot single-layer concentrated windings are used and coil windings are located on both sides of the armature teeth which decrease the harmonics of back EMF and improve winding utilization rate. The fault-tolerant teeth are introduced to achieve electrical, magnetic and thermal isolation between phases. When the motor has an open-circuit fault, the remaining healthy phases are not affected by the faulty phase, thus possessing strong fault-tolerance.

Part One: Derivation of Constant MMF Under an Open-Circuit Fault Condition

The five-phase fault-tolerant PMLM is powered by a voltage source inverter. The five phases are divided into phase-A, phase-B, phase-C, phase-D, and phase-E respectively. When the motor is in healthy operation, it is assumed that the zero-sequence space currents $i_{z1}$ and $i_{z2}$ have been controlled to zero. Then phase-A, phase-B, phase-C, phase-D and phase-E currents can be expressed as:

$$\begin{cases} i_A = i_\alpha \\ i_B = i_\alpha \cos a + i_\beta \sin a \\ i_C = i_\alpha \cos 2a + i_\beta \sin 2a \\ i_D = i_\alpha \cos 3a + i_\beta \sin 3a \\ i_E = i_\alpha \cos 4a + i_\beta \sin 4a \end{cases} \quad (1)$$

where $i_A$, $i_B$, $i_C$, $i_D$, $i_E$ are the currents in phase-A, phase-B, phase-C, phase-D and phase-E, respectively. $i_\alpha$ and $i_\beta$ are the currents in the α-β plane, respectively, $a=2\pi/5$, θ is the electrical angle, $$\theta = \int \frac{\pi v}{\tau} dt,$$

v is me electrical velocity of mover, and τ is the pole pitch of the five-phase fault-tolerant PMLM.

The traveling wave MMF of the five-phase PMLM is $$MMF = \sum_{i=A}^{E} MMF_i \qquad (2)$$
$$= Ni_A + \varepsilon Ni_B + \varepsilon^2 Ni_C + \varepsilon^3 Ni_D + \varepsilon^4 Ni_E$$

where $\varepsilon = e^{j2\pi/5}$, and N is the effective turns of each phase winding.

When a phase-A open-circuit fault occurs, its phase current is zero, so the traveling wave MMF of the remaining healthy phases can be expressed as $$MMF = \sum_{i=B,C,D,E} MMF_i \qquad (3)$$
$$= \varepsilon Ni_B + \varepsilon^2 Ni_c + \varepsilon^3 Ni_D + \varepsilon^4 Ni_E$$

When phase-A is in an open-circuit fault, to reach the purpose of disturbance-free operation, it is necessary to keep the same amplitude and speed of the MMF both in healthy and fault operation. Hence, (2) should be equal to (3). Because the windings are star-connected and its center point is not connected to the neutral point of the DC bus, the sum of healthy phase currents should be zero. Then, according to the constraint that amplitudes of the remaining healthy phase currents are equal, the remaining healthy phase currents can be expressed as:

$$\begin{cases} I_B = I_C = I_D = I_E \\ i_B + i_C + i_D + i_E = 0 \end{cases} \qquad (4)$$

where $I_B$, $I_C$, $I_D$, $I_E$ are the amplitudes of currents in phase-B, phase-C, phase-D, phase-E, respectively.

Based on the aforementioned constraints, the remaining healthy phase currents ($i_B$, $i_C$, $i_D$, $i_E$) under fault tolerance can be deduced:

$$\begin{bmatrix} i_B \\ i_C \\ i_D \\ i_E \end{bmatrix} = 1.382 \begin{bmatrix} \cos 0.5a & \sin 0.5a \\ \cos 2a & \sin 2a \\ \cos 3a & \sin 3a \\ \cos 4.5a & \sin 4.5a \end{bmatrix} \begin{bmatrix} i_\alpha \\ i_\beta \end{bmatrix} \qquad (5)$$

When an open-circuit fault occurs to phase-A, there remains only three degrees of freedom in the PMLM drive system, two of which are in the fundamental subspace and another is in the zero-sequence subspace. Since back-EMFs mainly contain fundamental components, the electromechanical energy conversion occurs in the fundamental subspace, and does not occur in the zero-sequence subspace. Therefore, according to (5), the basis of fundamental subspace can be defined as:

$$\begin{cases} T_1 = [\cos 0.5a \quad \cos 2a \quad \cos 3a \quad \cos 4.5a] \\ T_2 = [\sin 0.5a \quad \sin 2a \quad \sin 3a \quad \sin 4.5a] \end{cases} \qquad (6)$$

The basis of zero-sequence subspace is defined as z. Then, based on the orthogonal principle of the two subspaces and (5), the generalized Clarke transformation matrix $T_{4s/2s}$, which is applied to transform variables in the remaining healthy phases into the two-phase stationary frame, and its inverse transformation matrix $T_{2s/4s}$ are deduced as:

$$T_{4s/2s} = \begin{bmatrix} \cos 0.5a/3.618 & \cos 2a/3.618 & \cos 3a/3.618 & \cos 4.5a/3.618 \\ \sin 0.5a/1.91 & \sin 2a/1.91 & \sin 3a/1.91 & \sin 4.5a/1.91 \\ \sin a/5 & \sin 4a/5 & \sin 6a/5 & \sin 9a/5 \end{bmatrix} \qquad (7)$$

$$T_{2s/4s} = 1.382 \begin{bmatrix} \cos 0.5a & \sin 0.5a & \sin a \\ \cos 2a & \sin 2a & \sin 4a \\ \cos 3a & \sin 3a & \sin 6a \\ \cos 4.5a & \sin 4.5a & \sin 9a \end{bmatrix} \qquad (8)$$

Part Two: Derivation of a Circular Trajectory of the Stator Flux Vector in Fault Operation When the motor has an open-circuit fault, the compensatory voltages are designed to ensure a circular flux trajectory under the precondition of keeping a circular trajectory of the MMF vector.

When a phase-A open-circuit fault occurs, the relationship between the stator flux, permanent-magnet flux and remaining healthy phase currents can be still expressed as $\psi_s = L_s i_s + \psi_f$ which can be further expressed as:

$$\begin{bmatrix} \psi_B \\ \psi_C \\ \psi_D \\ \psi_E \end{bmatrix} = L_s \begin{bmatrix} i_B \\ i_C \\ i_D \\ i_E \end{bmatrix} + \lambda_m \begin{bmatrix} \cos(\theta - a) \\ \cos(\theta - 2a) \\ \cos(\theta - 3a) \\ \cos(\theta - 4a) \end{bmatrix} \qquad (9)$$

where $\psi_s$ are the stator fluxes, $\psi_s = [\psi_B \ \psi_C \ \psi_D \ \psi_E]^T$, $\psi_B$, $\psi_C$, $\psi_D$, $\psi_E$ are the stator fluxes of phase-B, phase-C, phase-D, phase-E, respectively. $i_s$ are the stator currents, $i_s = [i_B \ i_C \ i_D \ i_E]^T$, $\lambda_m$ is the amplitude of permanent-magnet flux, and $L_s$ is the phase inductance which is assumed as to be constant.

$T_{4s/2s}$ is adopted to transform the stator fluxes in the remaining healthy phases ($\psi_B$, $\psi_C$, $\psi_D$, $\psi_E$) to the actual stator flux components ($\psi_\alpha$, $\psi_\beta$) in the α-β plane and the flux $\psi_z$ in the zero-sequence subspace, which can be expressed as:

$$\begin{cases} \psi_s = \sqrt{\psi_\alpha^2 + \psi_\beta^2} \\ \psi_\alpha = L_s i_\alpha + 0.5\lambda_m \cos\theta \\ \psi_\beta = L_s i_\beta + 0.947\lambda_m \sin\theta \\ \psi_z = L_s i_z + 0.138\lambda_m \sin\theta \end{cases} \quad (10)$$

where $\psi_s$ is the actual stator flux amplitude, $\psi_\alpha$, $\psi_\beta$ are the actual stator fluxes in the α-β plane, and $i_z$ is the current in the zero-sequence subspace.

Equation (10) shows that the trajectory of the stator flux vector in the α-β plane is not circular when a phase-A open-circuit fault occurs. Then, if a suitable fault-tolerant algorithm is not employed to ensure the circular trajectory of the stator flux vector, the currents ($i_\alpha$, $i_\beta$) are no longer sinusoidal and their amplitudes are no longer equal. It will inevitably cause a large pulsation on the MMF. In order to keep a circular trajectory of the stator flux vector and the MMF vector simultaneously, the virtual stator flux $\psi_{xs}$ in the α-β plane is defined as:

$$\begin{cases} \psi_{xs} = \sqrt{\psi_{x\alpha}^2 + \psi_{x\beta}^2} \\ \psi_{x\alpha} = \lambda_m \cos\theta + L_s i_\alpha \\ \psi_{x\beta} = \lambda_m \sin\theta + L_s i_\beta \end{cases} \quad (11)$$

where $\psi_{x\alpha}$ and $\psi_{x\beta}$ are the components of virtual stator fluxes $\psi_{xs}$ in the α-β plane, and $\psi_{xs}$ is the amplitude of the virtual stator flux.

According to (10)-(11), the relationship between the actual and virtual stator fluxes is derived as:

$$\begin{cases} \psi_\alpha = \psi_{x\alpha} - 0.5\lambda_m \cos\theta \\ \psi_\beta = \psi_{x\beta} - 0.053\lambda_m \sin\theta \end{cases} \quad (12)$$

When a phase-A open-circuit fault occurs, the voltage model of the remaining healthy phases in the natural frame can be obtained as:

$$\begin{cases} u_B = Ri_B + \dfrac{d\psi_B}{dt} \\ u_C = Ri_C + \dfrac{d\psi_C}{dt} \\ u_D = Ri_D + \dfrac{d\psi_D}{dt} \\ u_E = Ri_E + \dfrac{d\psi_E}{dt} \end{cases} \quad (13)$$

where R is stator resistance which is recognized as constant value, and $u_B$, $u_C$, $u_D$, $u_E$ are the voltages in the remaining healthy phases.

The voltage model under fault condition is transformed into the α-β plane by $T_{4s/2s}$, and then it can be expressed as:

$$\begin{bmatrix} u_\alpha \\ u_\beta \end{bmatrix} = R \begin{bmatrix} i_\alpha \\ i_\beta \end{bmatrix} + \frac{d}{dt} \begin{bmatrix} \psi_\alpha \\ \psi_\beta \end{bmatrix} \quad (14)$$

where $u_\alpha$, $u_\beta$ are the actual stator voltages in the α-β plane, and $\psi_\alpha$, $\psi_\beta$ are the actual stator fluxes in the α-β plane.

When (12) is introduced into (14), the voltage model represented by the virtual stator fluxes can be expressed as:

$$\begin{bmatrix} u_\alpha \\ u_\beta \end{bmatrix} = R \begin{bmatrix} i_\alpha \\ i_\beta \end{bmatrix} + \frac{d}{dt} \begin{bmatrix} \psi_{x\alpha} \\ \psi_{x\beta} \end{bmatrix} - \lambda_m \omega \begin{bmatrix} -0.5\sin\theta \\ 0.053\cos\theta \end{bmatrix} \quad (15)$$

where ω is the electric angular velocity, $$\omega = \frac{\pi v}{\tau}.$$

The virtual stator voltages are defined as:

$$\begin{bmatrix} u_{x\alpha} \\ u_{x\beta} \end{bmatrix} = R \begin{bmatrix} i_\alpha \\ i_\beta \end{bmatrix} + \frac{d}{dt} \begin{bmatrix} \psi_{x\alpha} \\ \psi_{x\beta} \end{bmatrix} \quad (16)$$

where $u_{x\alpha}$, $u_{x\beta}$ are the components of virtual stator voltages in the α-β plane.

According to (15)-(16), the relationship between actual and virtual stator voltages can be derived as:

$$\begin{bmatrix} u_{x\alpha} \\ u_{x\beta} \end{bmatrix} = \begin{bmatrix} u_\alpha \\ u_\beta \end{bmatrix} + \lambda_m \omega \begin{bmatrix} -0.5\sin\theta \\ 0.053\cos\theta \end{bmatrix} \quad (17)$$

When the motor has an open-circuit fault, in order to keep the circular trajectories of the stator flux vector and the MMF vector, according to (17), the stator compensatory voltages $u_{comp\alpha}$, $u_{comp\beta}$ in the α-β plane are defined as:

$$\begin{cases} u_{comp\alpha} = -0.5\lambda_m \omega \sin\theta \\ u_{comp\beta} = 0.053\lambda_m \omega \cos\theta \end{cases} \quad (18)$$

Part Three: The FT-DTC Strategy Under an Open-Circuit Fault Condition $T_{4s/2s}$ is adopted to transform the currents in the remaining healthy phases to the currents $i_\alpha$, $i_\beta$ in the α-β plane and $i_z$ in the zero-sequence frame:

$$\begin{bmatrix} i_\alpha \\ i_\beta \\ i_z \end{bmatrix} = T_{4s/2s} \begin{bmatrix} i_B \\ i_C \\ i_D \\ i_E \end{bmatrix} \quad (19)$$

The PI controller is designed to control $i_z$ to zero, whose output is defined as the zero-sequence voltage reference $u^*_z$.

Since the CPWM method is applied in the present invention, components of voltages $u_\alpha$, $u_\beta$ in the α-β plane in fault tolerant operation are derived by $T_{4s/2s}$:

$$\begin{cases} u_\alpha = 0.2764 U_{dc}(u_b \cos 0.5a + u_c \cos 2a + u_d \cos 3a + u_e \cos 4.5a) \\ u_\beta = 0.5236 U_{dc}(u_b \sin 0.5a + u_c \sin 2a + u_d \sin 3a + u_e \sin 4.5a) \end{cases} \quad (20)$$

where $U_{dc}$ is the DC-bus voltage, and $u_b$, $u_c$, $u_d$, $u_e$ are the phase functions derived from the modulation of the phase-voltage references $u^*_B$, $u^*_C$, $u^*_D$, $u^*_E$ by the CPWM method.

According to (17), the virtual voltages $u_{x\alpha}$ and $u_{x\beta}$ are obtained as:

$$\begin{cases} u_{x\alpha} = u_\alpha + u_{comp\alpha} \\ u_{x\beta} = u_\beta + u_{comp\beta} \end{cases} \quad (21)$$

The back EMF method is applied to construct a flux observer, and then the virtual stator flux $\psi_{x\alpha}$ and $\psi_{x\beta}$ in the $\alpha$-$\beta$ plane are observed as:

$$\begin{cases} \psi_{x\alpha} = \dfrac{1}{s+\omega_c}(u_{x\alpha} - i_\alpha R) + \dfrac{\omega_c}{s+\omega_c} z_{x\alpha} \\ \psi_{x\beta} = \dfrac{1}{s+\omega_c}(u_{x\beta} - i_\beta R) + \dfrac{\omega_c}{s+\omega_c} z_{x\beta} \\ \psi_{xs} = \sqrt{\psi_{x\alpha}^2 + \psi_{x\beta}^2} \\ \theta_s = \mathrm{arctg}\dfrac{\psi_{x\beta}}{\psi_{x\alpha}} \end{cases} \quad (22)$$

$$z_{x\alpha} = \begin{cases} \psi_{x\alpha} & |\psi_{x\alpha}| \le \psi_{max} \\ \psi_{max} & |\psi_{x\alpha}| > \psi_{max} \end{cases} \quad (23)$$

$$z_{x\beta} = \begin{cases} \psi_{x\beta} & |\psi_{x\beta}| \le \psi_{max} \\ \psi_{max} & |\psi_{x\beta}| > \psi_{max} \end{cases} \quad (24)$$

where $\omega_c$ is the cutoff frequency of the low pass filter, $\psi_{max}$ is the limited value of stator flux, $\theta_s$ is the virtual stator flux angle, and s is the integral operator.

By employing the magnetic co-energy method, a thrust-force observer in fault-tolerant operation can be built as:

$$F_e = \frac{2.5\pi}{\tau}(\psi_{x\alpha}i_\beta - \psi_{x\beta}i_\alpha) + \frac{0.955\pi}{\tau}\lambda_m i_z \cos\theta \quad (25)$$

The difference between thrust-force reference $F^*_e$ and estimated value $F_e$ is adjusted to generate an incremental angle of thrust-force $\Delta\delta$ by a PI regulator. Then, according to the observed virtual stator flux amplitude $\psi_{xs}$, the flux reference $\psi^*_s$ and the virtual stator flux angle $\theta_s$, the difference $\Delta\psi_{x\alpha}$, $\Delta\psi_{x\beta}$ between the flux reference and observed virtual stator flux in the $\alpha\beta$ plane can be derived as:

$$\begin{cases} \Delta\psi_{x\alpha} = \psi^*_s \cos(\theta_s + \Delta\delta) - \psi_{x\alpha} \\ \Delta\psi_{x\beta} = \psi^*_s \sin(\theta_s + \Delta\delta) - \psi_{x\beta} \end{cases} \quad (26)$$

Based on (16)-(26), the components of the virtual stator voltage references $(u^*_{x\alpha}, u^*_{x\beta})$ in the $\alpha$-$\beta$ plane are deduced as:

$$\begin{cases} u^*_{x\alpha} = Ri_\alpha + \dfrac{\Delta\psi_{x\alpha}}{T} \\ u^*_{x\beta} = Ri_\beta + \dfrac{\Delta\psi_{x\beta}}{T} \end{cases} \quad (27)$$

where T is the sampling period.

On the basis of the relationship between actual and virtual stator voltages in (17), the actual stator voltage references $u^*_\alpha$, $u^*_\beta$ in the $\alpha$-$\beta$ plane in fault-tolerant operation are derived as:

$$\begin{cases} u^*_\alpha = u^*_{x\alpha} - u_{comp\alpha} \\ u^*_\beta = u^*_{x\beta} - u_{comp\beta} \end{cases} \quad (28)$$

and $$U^*_s = \begin{bmatrix} u^*_{x\alpha} \\ u^*_{x\beta} \end{bmatrix}.$$

$T_{2s/4s}$ is adopted to transform the actual voltage references $u^*_\alpha$, $u^*_\beta$ and the zero-sequence voltage reference $u^*_z$ to the references $u^*_B$, $u^*_C$, $u^*_D$, $u^*_E$ in the natural frame, which can be expressed as:

$$\begin{bmatrix} u^*_B \\ u^*_C \\ u^*_D \\ u^*_E \end{bmatrix} = T_{2s/4s} \begin{bmatrix} u^*_\alpha \\ u^*_\beta \\ u^*_z \end{bmatrix} \quad (29)$$

where the voltage reference of phase-A is set as $u^*_A=0$, since an open-circuit fault occurs in phase-A.

On the basis of the traditional CPWM method with a sinusoidal modulation wave, the same flux control effect as the five-phase SVPWM method can be achieved when zero-sequence voltage harmonics $c_0=\max(u_i)+\min(u_i))/2$ is injected into five-phase sinusoidal modulation waves ($u_i$ is five-phase sinusoidal modulating wave function for each phase). Hence, this invention performs the CPWM method with the injection of zero-sequence voltage harmonics.

By using the CPWM method with the injection of zero-sequence voltage harmonics, the phase voltage references $u^*_A$, $u^*_B$, $u^*_C$, $u^*_D$, $u^*_E$ (29) fed to voltage source inverter are used to realize FT-DTC disturbance-free operation when a five-phase fault-tolerant PMLM is under an open-circuit fault condition. The proposed FT-DTC strategy for a fault-tolerant PMLM with a one-phase open-circuit fault is shown in FIG. 3.

Figure 2:
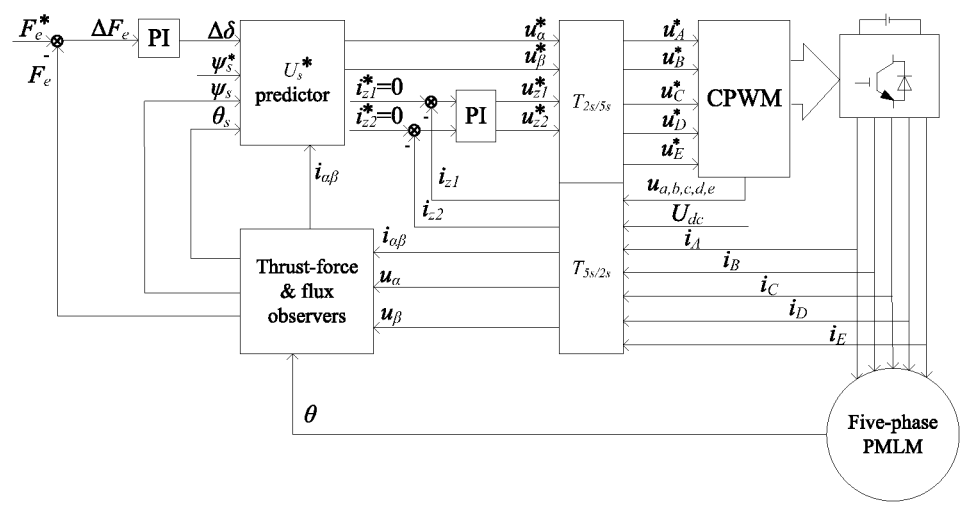
FIG. 2 shows the schematic diagram of the DTC strategy for the five-phase fault-tolerant PMLM of the present invention.
Figure 3:
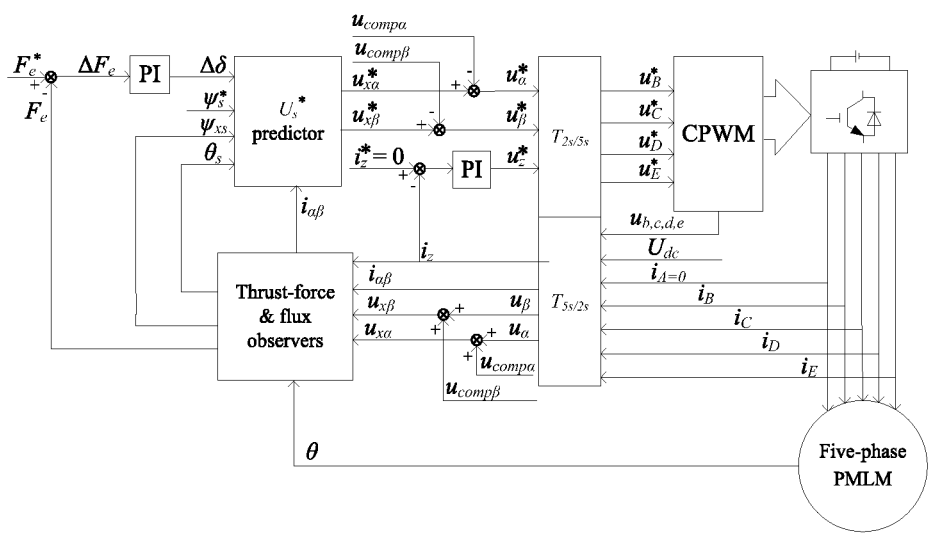
FIG. 3 shows the schematic diagram of a FT-DTC method for the five-phase fault-tolerant PMLM with the phase-A open-circuit fault of the present invention.

According to FIGS. 2 and 3, the simulation model of a five-phase fault-tolerant PMLM is established in Matlab/Simulink, and then simulated results are obtained when the five-phase fault-tolerant PMLM has a one-phase open-circuit fault.

Figure 4:
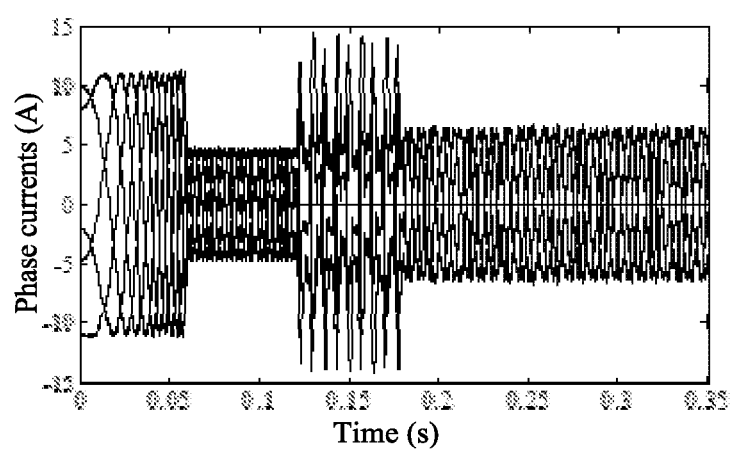
FIG. 4 shows the waveforms of phase currents under the phase-A open-circuit fault condition without and with the FT-DTC of the present invention.
Figure 5:
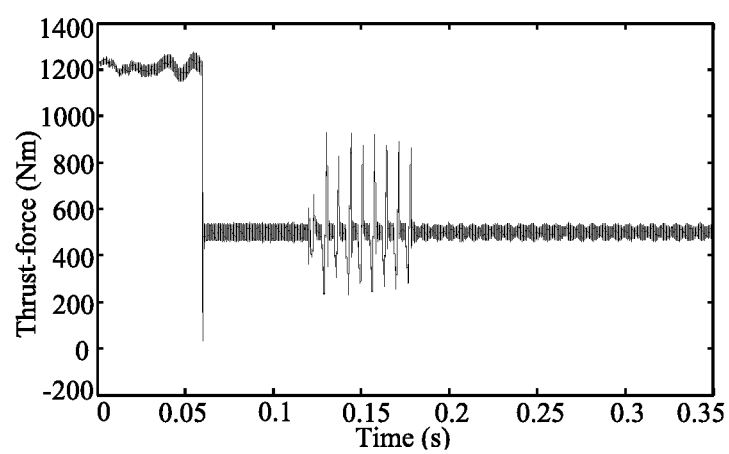
FIG. 5 shows the waveforms of thrust-force under the phase-A open-circuit fault condition without and with the FT-DTC of the present invention.
Figure 6:
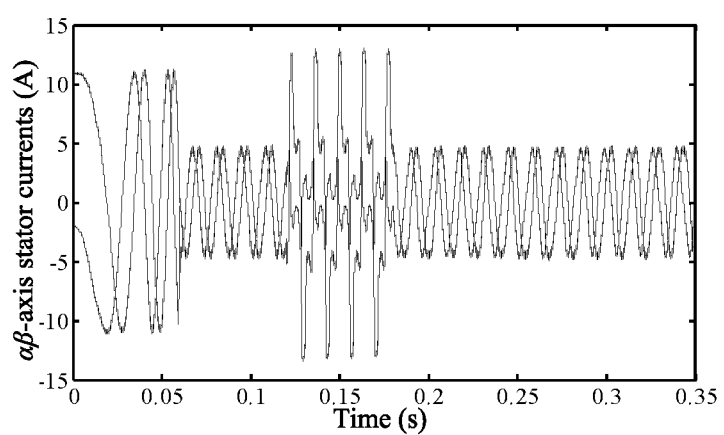
FIG. 6 shows the waveforms of stator currents in the α-β plane under the phase-A open-circuit fault condition without and with the FT-DTC of the present invention.
Figure 7:
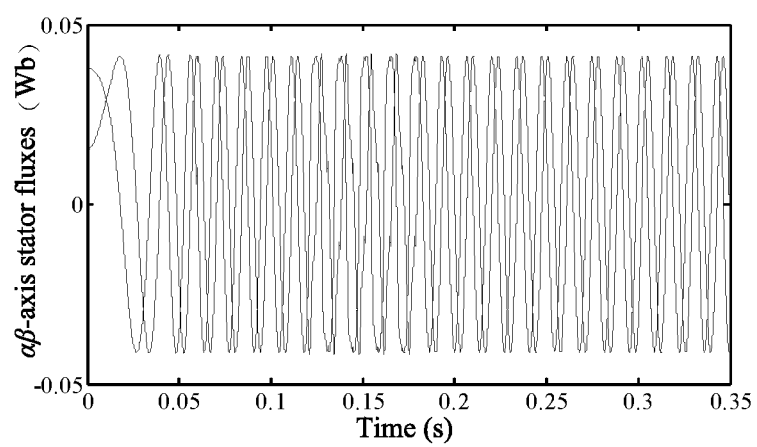
FIG. 7 shows the waveforms of stator fluxes in the α-β plane under the phase-A open-circuit fault condition without and with the FT-DTC of the present invention.
Figure 8:
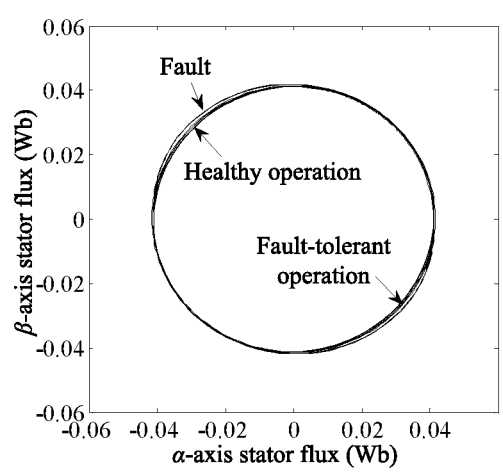
FIG. 8 shows the trajectory of stator flux vector in the α-β plane under the phase-A open-circuit fault without and with the FT-DTC of the present invention.
Figure 9:
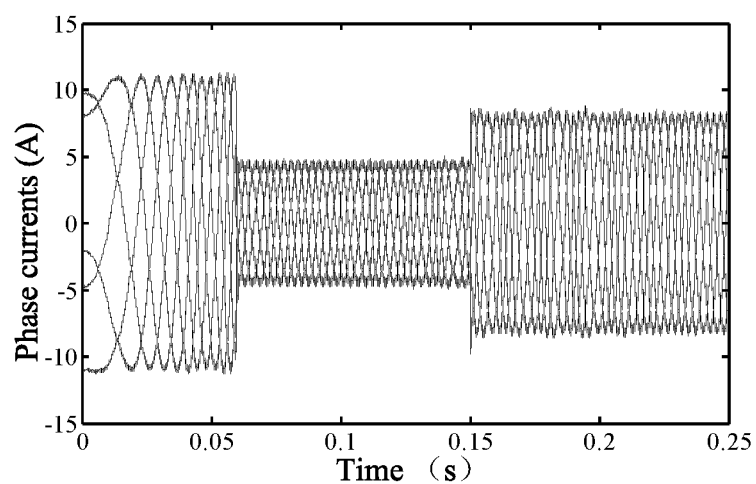
FIG. 9 shows the waveforms of phase currents when the thrust-force reference steps in healthy operation of the present invention.
Figure 10:
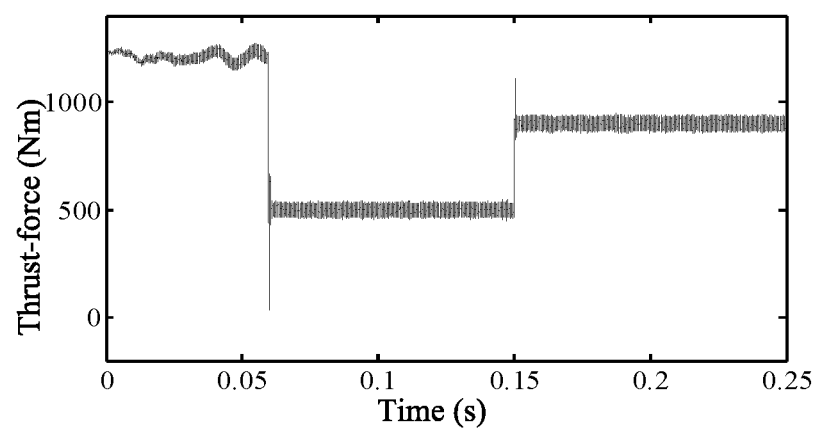
FIG. 10 shows the waveform of thrust-force when the thrust-force reference steps in healthy operation of the present invention.
Figure 11:
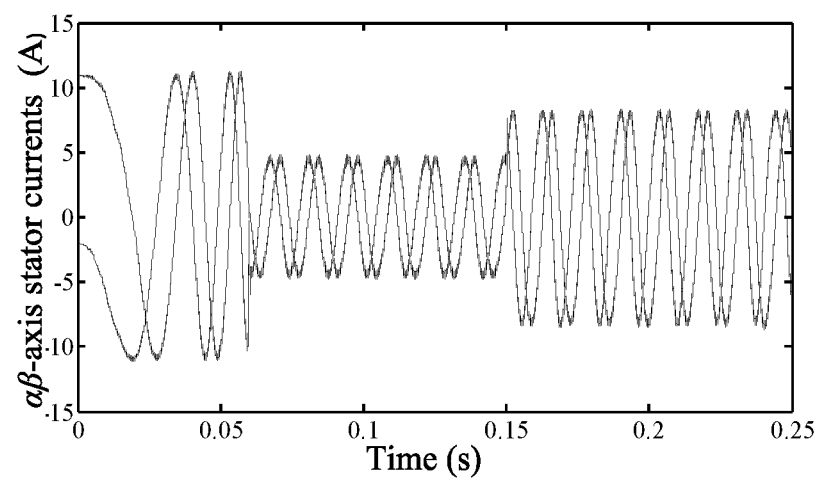
FIG. 11 shows the waveforms of stator currents in the α-β plane when the thrust-force reference steps in healthy operation of the present invention.
Figure 12:
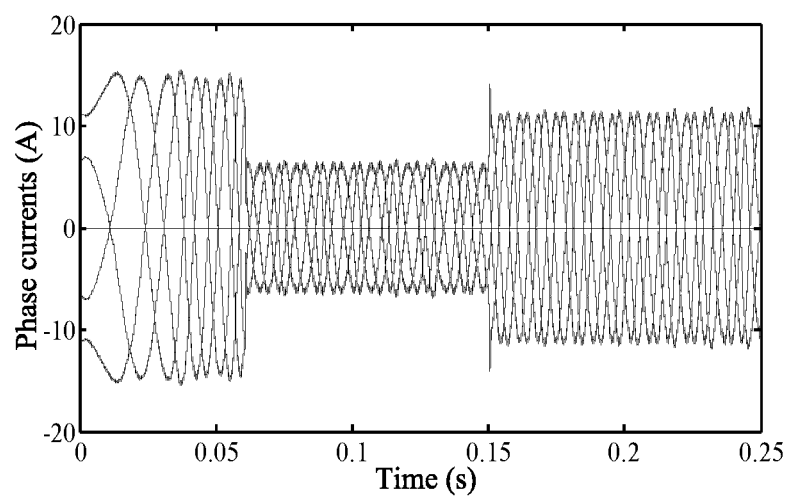
FIG. 12 shows the waveforms of phase currents when the thrust-force reference steps under a phase-A open-circuit fault condition with the FT-DTC of the present invention.
Figure 13:
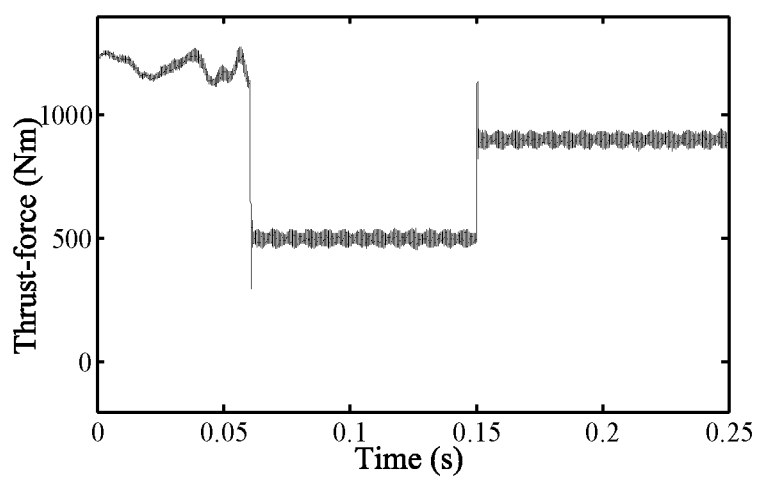
FIG. 13 shows the waveform of the output thrust when the thrust reference steps under a phase-A open-circuit fault condition with the FT-DTC of the present invention.
Figure 14:
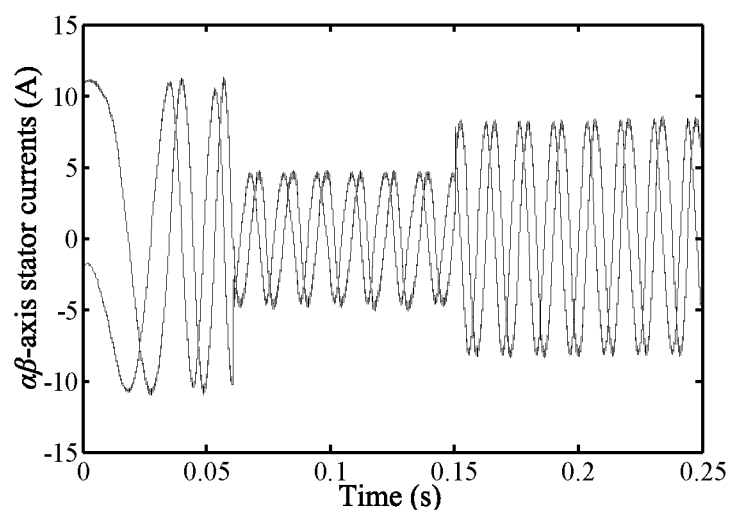
FIG. 14 shows the waveforms of the stator currents in the α-β plane when the thrust-force reference steps under a phase-A open-circuit fault condition with the FT-DTC of the present invention.

FIG. 4 shows phase current waveforms without and with the proposed FT-DTC method in phase-A open-circuit fault operation. When a phase-A open-circuit fault occurs at 0.12 s, the waveforms of the phase currents are distorted. The proposed FT-DTC strategy in the present invention is injected at 0.18 s, and then the sinusoidal waveforms of currents are obtained. FIG. 5 shows thrust-force waveforms without and with the proposed FT-DTC method under phase-A open-circuit fault conditions. When a phase-A open-circuit fault occurs at 0.12 s, the fluctuations of the thrust-force are significant. The proposed FT-DTC strategy in the present invention is injected at 0.18 s, then the thrust-force pulsation is effectively suppressed, and there are almost no fluctuations. FIG. 6 shows waveforms of stator currents in the $\alpha$-$\beta$ plane without and with the proposed FT-DTC under phase-A open-circuit fault conditions. When a phase-A open-circuit occurs at 0.12 s, the current distortion is significant, and the proposed FT-DTC strategy in the present invention is injected at 0.18 s. Then the sinusoidal waveform of currents is obtained, and their distortion is significantly decreased. FIG. 7 shows waveforms of stator fluxes in the $\alpha$-$\beta$ plane without and with the proposed FT-DTC under phase-A open-circuit fault conditions. When a phase-A open-circuit fault occurs at 0.12 s, although the difference between the flux amplitudes in healthy and fault operation is small, the waveforms of stator fluxes in the α-β plane are distorted seriously. The proposed FT-DTC strategy in the present invention is applied at 0.18 s, and then the sinusoidal waveforms of stator fluxes in the α-β plane are almost the same as those in healthy operation. FIG. 8 shows flux trajectory in the α-β plane without and with the proposed FT-DTC strategy under phase-A open-circuit fault conditions. The stator flux trajectory is no longer circular until the proposed FT-DTC in the present invention is injected. FIGS. 9-11 show the responses of phase currents, thrust-force and stator current components in the α-β plane, respectively, when the thrust-force reference steps in healthy operation, and their response time is 1 ms. FIGS. 12-14 show responses of phase currents, thrust-force and stator current components in the α-β plane, respectively, when thrust-force reference steps in FT-DTC operation under a phase-A open-circuit fault, and their response time is still 1 ms. It can be concluded that the motor with the proposed FT-DTC in fault operation has the same dynamic performance as that in healthy operation when a phase-A open-circuit fault occurs. The thrust-force has almost no fluctuation both in healthy and fault operation, the phase currents also have almost no distortion. Therefore, fault-tolerant disturbance-free operation is realized. Meanwhile, the dynamic performance is not affected, which is the same as that in healthy operation.

If an open-circuit fault occurs in any other phase, the electrical angular difference between the phase and phase-A is kα. k=0, 1, 2, 3, 4. k=0 corresponds to the phase-A open-circuit fault. k=1 corresponds to the phase-B open-circuit fault. k=2 corresponds to the phase-C open-circuit fault. k=3 corresponds to the phase-D open-circuit fault. k=4 corresponds to the phase-E open-circuit fault. Then the natural frame needs to be counterclockwise rotated by 0.4 kπ electrical angle to ensure the axis of the faulty phase overlaps with the axis of phase-A in healthy operation. Hence, θ in the FT-DTC strategy should be replaced by θ−0.4 kπ, and then the stator compensation voltages are expressed as:

$$\begin{cases} u_{comp\alpha} = -0.5\lambda_m \omega \sin(\theta - 0.4k\pi) \\ u_{comp\beta} = 0.053\lambda_m \omega \cos(\theta - 0.4k\pi) \end{cases} \quad (30)$$

It can be seen from the aforementioned statement that the five-phase PMLM with the proposed FT-DTC strategy in open-circuit fault operation can not only output the same thrust-force as that with DTC in healthy operation, but also restrain the thrust-force fluctuation significantly when the currents are less than the limited current. Last but not least, the PMLM with the proposed FT-DTC in fault operation has the same dynamic performance, steady-state performance and tracking accuracy of thrust-force as those in healthy operation. It is suitable for any other phase open-circuit fault, and there is no complicated calculation, and a low CPU overhead. Compared with field-oriented control strategy, the invention has a simple structure, small CPU overhead and faster dynamic response, and it has good application prospects in electromagnetic active suspension systems with high requirements on operational reliability and high dynamic performance.

Although the present invention has been disclosed as the above implemented example, the example is not used to limit the invention. Any equivalent change or modification within the spirit and field of the present invention belongs to the scope of the invention.

What is claimed is:

1. A fault-tolerant direct thrust-force control (FT-DTC) method for a five-phase permanent-magnet linear motor (PMLM) with a one-phase open-circuit fault, comprising the following steps:
   (1) establishing a five-phase PMLM model;
   (2) dividing windings of the five-phase PMLM into phase-A, phase-B, phase-C, phase-D, and phase-E, and when a phase-A open-circuit fault occurs, according to a principle wherein a traveling wave magneto-motive force (MMF) is constant both in a healthy operation and a fault operation, and according to a constraint wherein a sum of remaining healthy phase currents is zero, and amplitudes of the remaining healthy phase currents are equal, obtaining currents $i_B$, $i_C$, $i_D$, $i_E$ in remaining healthy phases, and then, based on the currents, deriving a generalized Clarke transformation $T_{4S/2S}$, wherein the generalized Clarke transformation is employed to transform variations in a natural frame into a two-phase stationary frame named as an α-β plane, and inverse transformation matrix $T_{2s/4s}$ of the generalized Clarke transformation;
   (3) according to a relationship between a stator flux and a permanent-magnet flux: $\psi_s = L_s i_s + \psi_f$ using $T_{4s/2s}$ to transform the stator fluxes $\psi_B, \psi_C, \psi_D, \psi_E$ in the natural frame into the α-β plane and a zero-sequence subspace by the following equations:

$$\begin{cases} \psi_s = \sqrt{\psi_\alpha^2 + \psi_\beta^2} \\ \psi_\alpha = L_s i_\alpha + 0.5\lambda_m \cos\theta \\ \psi_\beta = L_s i_\beta + 0.947\lambda_m \sin\theta \\ \psi_z = L_s i_z + 0.138\lambda_m \sin\theta \end{cases} ;$$

wherein $L_s$ is a phase inductance recognized as a constant value, $i_s$ are stator currents, $i_s = [i_B \ i_C \ i_D \ i_E]^T$, $i_\alpha$ and $i_\beta$ are components of the stator currents in the α-β plane, $\psi_s$ are the stator fluxes, $\psi_s = [\psi_B \ \psi_C \ \psi_D \ \psi_E]^T$, $\psi_s$ is an amplitude of the stator fluxes, $\psi_B, \psi_C, \psi_D, \psi_E$ are the stator fluxes in phase-B, phase-C, phase-D and phase-E, respectively; $\psi_\alpha, \psi_\beta$ are the stator fluxes in the α-β plane, $\psi_z$ is a flux in the zero-sequence subspace, $\psi_f$ are the permanent-magnet fluxes coupled to stator windings, and are expressed as:

$$\psi_f = \lambda_m \begin{bmatrix} \cos(\theta - a) \\ \cos(\theta - 2a) \\ \cos(\theta - 3a) \\ \cos(\theta - 4a) \end{bmatrix};$$

wherein $\lambda_m$ is a permanent-magnet flux amplitude, $a = 2\pi/5$, θ is an electrical angle, $$\theta = \int \frac{\pi v}{\tau} dt,$$

τ is a pole pitch of the five-phase PMLM, and v is an electrical velocity of a mover;

(4) according to a principle wherein that trajectories of a stator flux vector and an MMF vector in the α-β plane are all circular when the five-phase permanent-magnet linear motor is in a fault-tolerant operation, deriving a virtual stator flux $\psi_{xs}$ in the α-β plane from step (3), by the following equations:

$$\begin{cases} \psi_{xs} = \sqrt{\psi_{x\alpha}^2 + \psi_{x\beta}^2} \\ \psi_{x\alpha} = \lambda_m \cos\theta + L_s i_\alpha \\ \psi_{x\beta} = \lambda_m \sin\theta + L_s i_\beta \end{cases};$$

wherein $\psi_{x\alpha}$ and $\psi_{x\beta}$ are the virtual stator flux $\psi_{xs}$ in the α-β plane, and $\psi_{xs}$ is an amplitude of the virtual stator flux;

(5) deriving a relationship between actual stator voltages and virtual stator voltages in the α-β plane based on $T_{4s/2s}$ and the virtual stator flux $\psi_{xs}$ derived from Step (4), by the following equation:

$$\begin{bmatrix} u_{x\alpha} \\ u_{x\beta} \end{bmatrix} = \begin{bmatrix} u_\alpha \\ u_\beta \end{bmatrix} + \lambda_m \omega \begin{bmatrix} -0.5\sin\theta \\ 0.053\cos\theta \end{bmatrix};$$

wherein $u_\alpha$ and $u_\beta$ are the actual stator voltages in the α-β plane, and $u_{x\alpha}$, $u_{x\beta}$ are the virtual stator voltages in the α-β plane;

(6) in order to keep circular trajectories of the stator flux vector and the MMF vector in the α-β plane under open-circuit fault conditions, according to step (5), defining stator compensatory voltages $u_{comp\alpha}$ and $u_{comp\beta}$ in the α-β plane as:

$$\begin{cases} u_{comp\alpha} = -0.5\lambda_m \omega \sin\theta \\ u_{comp\beta} = 0.053\lambda_m \omega \cos\theta \end{cases};$$

(7) when the phase-A open-circuit fault occurs, adopting $T_{4s/2s}$ to transform currents $i_B$, $i_C$, $i_D$, $i_E$ in the remaining healthy phases to the currents $i_\alpha$, $i_\beta$ in the α-β plane and a current $i_z$ in the zero-sequence subspace, and based on transformed currents, estimating a virtual stator flux amplitude $\psi_{xs}$, a virtual stator flux angle $\theta_s$ and a thrust-force $F_e$ by flux and thrust-force observers, and at the same time, controlling $i_z$ to zero by a Proportional Integral (PI) controller, wherein an output of the PI controller is defined as a zero-sequence voltage reference $u^*_z$;

(8) adjusting a difference between a thrust-force reference $F^*_e$ and an observed value $F_e$ to generate an incremental angle $\Delta\delta$ of the thrust-force by the PI controller, and then, according to the virtual stator flux amplitude $\psi_{xs}$, a flux reference $\psi^*_s$ and the virtual stator flux angle $\theta_s$, deriving differences $\Delta\psi_{x\alpha}$, $\Delta\psi_{x\beta}$ between the flux reference and the virtual stator fluxes in the α-β plane as:

$$\begin{cases} \Delta\psi_{x\alpha} = \psi^*_s \cos(\theta_s + \Delta\delta) - \psi_{x\alpha} \\ \Delta\psi_{x\beta} = \psi^*_s \sin(\theta_s + \Delta\delta) - \psi_{x\beta} \end{cases};$$

(9) based on the virtual stator voltages derived from step (5):

$$\begin{bmatrix} u_{x\alpha} \\ u_{x\beta} \end{bmatrix} = R \begin{bmatrix} i_\alpha \\ i_\beta \end{bmatrix} + \frac{d}{dt} \begin{bmatrix} \psi_{x\alpha} \\ \psi_{x\beta} \end{bmatrix},$$

deriving virtual stator voltage references $u^*_{x\alpha}$, $u^*_{x\beta}$ as:

$$\begin{cases} u^*_{x\alpha} = Ri_\alpha + \frac{\Delta\psi_{x\alpha}}{T} \\ u^*_{x\beta} = Ri_\beta + \frac{\Delta\psi_{x\beta}}{T} \end{cases};$$

wherein T is a sampling period;

(10) using the stator compensatory voltages derived from step (6) to deduce components of actual stator voltage references $u^*_\alpha$, $u^*_\beta$ in the α-β plane in the fault-tolerant operation, wherein the components the actual stator voltage references are expressed as:

$$\begin{cases} u^*_\alpha = u^*_{x\alpha} - u_{comp\alpha} \\ u^*_\beta = u^*_{x\beta} - u_{comp\beta} \end{cases};$$

(11) adopting $T_{2s/4s}$ to transform the actual stator voltage references $u^*_\alpha$, $u^*_\beta$, $u^*_z$ derived from steps (7) and (10) to phase voltage references $u^*_B$, $u^*_C$, $u^*_D$, $u^*_E$ in the natural frame, when the phase-A open-circuit fault occurs, voltage reference of the phase-A is set as $u^*_A = 0$; and

(12) feeding the phase voltage references $u^*_A$, $u^*_B$, $u^*_C$, $u^*_D$, $u^*_E$ derived from step (11) to a voltage source inverter, and then by using a carrier pulse width modulation (CPWM) method, achieving a FT-DTC disturbance-free operation of a five-phase fault-tolerant PMLM under phase-A open-circuit fault conditions.

2. The FT-DTC method of claim 1, wherein the step (2) further comprises:

(2.1) a design object of the FT-DTC method is the five-phase PMLM, wherein the windings of the five-phase PMLM are star-connected and a center point of the five-phase PMLM is not connected to a DC bus, according to the principle wherein the traveling wave MMF remains constant both in the healthy operation and the fault operation, and the sum of the remaining healthy phase currents is zero, and the amplitudes of the remaining healthy phase currents are equal, the currents $i_B$, $i_C$, $i_D$, $i_E$ in the remaining healthy phases under the phase-A open-circuit fault conditions are deduced as:

$$\begin{bmatrix} i_B \\ i_C \\ i_D \\ i_E \end{bmatrix} = 1.382 \begin{bmatrix} \cos 0.5a & \sin 0.5a \\ \cos 2a & \sin 2a \\ \cos 3a & \sin 3a \\ \cos 4.5a & \sin 4.5a \end{bmatrix} \begin{bmatrix} i_\alpha \\ i_\beta \end{bmatrix};$$

wherein $i_\alpha$, $i_\beta$ are the stator currents in the α-β plane;

(2.2) when the phase-A open-circuit fault occurs, a PMLM drive system has three degrees of freedom remaining, two of the three degrees of freedom are in a fundamental subspace and one of the three degrees of freedom is in the zero-sequence subspace, a basis of the fundamental subspace $T_1$, $T_2$ are defined as:

$$\begin{cases} T_1 = [\cos 0.5a \quad \cos 2a \quad \cos 3a \quad \cos 4.5a] \\ T_2 = [\sin 0.5a \quad \sin 2a \quad \sin 3a \quad \sin 4.5a] \end{cases};$$

(2.3) z is defined as a basis in the zero-sequence subspace, according to a principle wherein two subspaces are orthogonal, and the remaining healthy-phase currents derived from step (2.1), the generalized Clarke transform matrix $T_{4s/2s}$, wherein the generalized Clarke transform matrix is applied to transform variables in the natural frame into the two-phase stationary frame and an inverse transform matrix $T_{2s/4s}$ of the generalized Clarke transform matrix are obtained.

3. The FT-DTC method of claim 2, wherein the generalized Clarke transformation matrix $T_{4s/2s}$ and the inverse transformation matrix $T_{2s/4s}$ of the generalized Clarke transform matrix are deduced as respectively:

$$T_{4s/2s} = \begin{bmatrix} \cos 0.5a/3.618 & \cos 2a/3.618 & \cos 3a/3.618 & \cos 4.5a/3.618 \\ \sin 0.5a/1.91 & \sin 2a/1.91 & \sin 3a/1.91 & \sin 4.5a/1.91 \\ \sin a/5 & \sin 4a/5 & \sin 6a/5 & \sin 9a/5 \end{bmatrix}; \text{ and}$$

$$T_{2s/4s} = 1.382 \begin{bmatrix} \cos 0.5a & \sin 0.5a & \sin a \\ \cos 2a & \sin 2a & \sin 4a \\ \cos 3a & \sin 3a & \sin 6a \\ \cos 4.5a & \sin 4.5a & \sin 9a \end{bmatrix}.$$

4. The FT-DTC method of claim 1, wherein the step (5) further comprises:

(5.1) when the phase-A open-circuit fault occurs, a voltage model of the five-phase PMLM in the natural frame is:

$$\begin{cases} u_B = Ri_B + \dfrac{d\psi_B}{dt} \\ u_C = Ri_C + \dfrac{d\psi_C}{dt} \\ u_D = Ri_D + \dfrac{d\psi_D}{dt} \\ u_E = Ri_E + \dfrac{d\psi_E}{dt} \end{cases};$$

wherein R is a stator resistance assumed as a constant value, and $U_B$, $U_C$, $U_D$, $U_E$ are voltages of the remaining healthy phases;

(5.2) $T_{4s/2s}$ is adopted to transform the voltage model from the natural frame into the α-β plane, by the following equation:

$$\begin{bmatrix} u_\alpha \\ u_\beta \end{bmatrix} = R \begin{bmatrix} i_\alpha \\ i_\beta \end{bmatrix} + \frac{d}{dt} \begin{bmatrix} \psi_\alpha \\ \psi_\beta \end{bmatrix};$$

wherein $u_\alpha$, $u_\beta$ are actual voltages in the α-β plane;

(5.3) according to steps (3)-(4), the relationship between the actual stator fluxes and the virtual stator fluxes is derived as:

$$\begin{cases} \psi_\alpha = \psi_{x\alpha} - 0.5\lambda_m \cos\theta \\ \psi_\beta = \psi_{x\beta} - 0.053\lambda_m \sin\theta \end{cases};$$

(5.4) by using the virtual stator fluxes, the voltage model derived from step (5.2) is be further expressed as:

$$\begin{bmatrix} u_\alpha \\ u_\beta \end{bmatrix} = R \begin{bmatrix} i_\alpha \\ i_\beta \end{bmatrix} + \frac{d}{dt} \begin{bmatrix} \psi_{x\alpha} \\ \psi_{x\beta} \end{bmatrix} - \lambda_m \omega \begin{bmatrix} -0.5\sin\theta \\ 0.053\cos\theta \end{bmatrix};$$

wherein ω is an electrical angular velocity, $$\omega = \frac{\pi v}{\tau};$$

(5.5) the virtual stator voltages are defined as:

$$\begin{bmatrix} u_{x\alpha} \\ u_{x\beta} \end{bmatrix} = R \begin{bmatrix} i_\alpha \\ i_\beta \end{bmatrix} + \frac{d}{dt} \begin{bmatrix} \psi_{x\alpha} \\ \psi_{x\beta} \end{bmatrix},$$

then the relationship between the actual stator voltages and the virtual stator voltages are obtained.

5. The FT-DTC method of claim 4, wherein the relationship between the actual stator voltages and the virtual stator voltages is:

$$\begin{bmatrix} u_{x\alpha} \\ u_{x\beta} \end{bmatrix} = \begin{bmatrix} u_\alpha \\ u_\beta \end{bmatrix} + \lambda_m \omega \begin{bmatrix} -0.5\sin\theta \\ 0.053\cos\theta \end{bmatrix}.$$

6. The FT-DTC method of claim 1, wherein the step (7) further comprises:

(7.1) $T_{4s/2s}$ is adopted to transform the healthy phase currents from the natural frame into the α-β plane and a zero-sequence frame, by the following equation:

$$\begin{bmatrix} i_\alpha \\ i_\beta \\ i_z \end{bmatrix} = T_{4s/2s} \begin{bmatrix} i_B \\ i_C \\ i_D \\ i_E \end{bmatrix};$$

(7.2) combining with the CPWM method, the actual stator voltages ($u_\alpha$, $u_\beta$) in the α-β plane under fault tolerant conditions are derived by $T_{4s/2s}$:

$$\begin{cases} u_\alpha = 0.2764 U_{dc}(u_b \cos 0.5a + u_c \cos 2a + u_d \cos 3a + u_e \cos 4.5a) \\ u_\beta = 0.5236 U_{dc}(u_b \sin 0.5a + u_c \sin 2a + u_d \sin 3a + u_e \sin 4.5a) \end{cases};$$

wherein $U_{dc}$ is a DC bus voltage, and $u_b$, $u_c$, $u_d$, $u_e$ are phase functions derived from a modulation of the phase voltage references $u^*_B$, $u^*_C$, $u^*_D$, $u^*_E$ by the CPWM method;

(7.3) according to step (5), the virtual stator voltages in the α-β plane are calculated as:

$$\begin{bmatrix} u_{x\alpha} \\ u_{x\beta} \end{bmatrix} = \begin{bmatrix} u_\alpha \\ u_\beta \end{bmatrix} + \lambda_m \omega \begin{bmatrix} -0.5\sin\theta \\ 0.053\cos\theta \end{bmatrix};$$

(7.4) a virtual stator flux observer is built to estimate the virtual stator flux in the α-β plane:

$$\begin{cases} \psi_{x\alpha} = \dfrac{1}{s+\omega_c}(u_{x\alpha} - i_\alpha R) + \dfrac{\omega_c}{s+\omega_c}z_{x\alpha} \\ \psi_{x\beta} = \dfrac{1}{s+\omega_c}(u_{x\beta} - i_\beta R) + \dfrac{\omega_c}{s+\omega_c}z_{x\beta} \\ \psi_{xs} = \sqrt{\psi_{x\alpha}^2 + \psi_{x\beta}^2} \\ \theta_s = \text{arctg}\,\dfrac{\psi_{x\beta}}{\psi_{x\alpha}} \end{cases} ;\text{ and}$$

$$z_{x\alpha} = \begin{cases} \psi_{x\alpha} & |\psi_{x\alpha}| \le \psi_{max} \\ \psi_{max} & |\psi_{x\alpha}| > \psi_{max} \end{cases}$$

$$z_{x\beta} = \begin{cases} \psi_{x\beta} & |\psi_{x\beta}| \le \psi_{max} \\ \psi_{max} & |\psi_{x\beta}| > \psi_{max} \end{cases};$$

wherein $\omega_c$ is a cutoff frequency of a low pass filter, $\psi_{max}$ is a limited value of the stator flux, and s is an integral algorithm;

(7.5) by employing a magnetic co-energy method, the thrust-force observer is established in the fault-tolerant operation:

$$F_e = \frac{2.5\pi}{\tau}(\psi_{x\alpha}i_\beta - \psi_{x\beta}i_\alpha) + \frac{0.955\pi}{\tau}\lambda_m i_z \cos\theta.$$

7. The FT-DTC method of claim 1, wherein if an open-circuit fault occurs in any other phase, an electrical angular difference between a faulty phase and the phase-A is kα, k=0,1,2,3,4, k=0 corresponds to the phase-A open-circuit fault; k=1 corresponds to a phase-B open-circuit fault; k=2 corresponds to a phase-C open-circuit fault; k=3 corresponds to a phase-D open-circuit fault; k=4 corresponds to a phase-E open-circuit fault, then the natural frame is rotated counterclockwise by 0.4 kπ electrical angle to ensure an axis of the faulty phase overlaps with an axis of the phase-A in the healthy operation, hence, θ in a FT-DTC strategy is replaced by θ−0.4 kπ, and then the stator compensatory voltages are changed as:

$$\begin{cases} u_{comp\alpha} = -0.5\lambda_m\omega\sin(\theta - 0.4k\pi) \\ u_{comp\beta} = 0.053\lambda_m\omega\cos(\theta - 0.4k\pi) \end{cases}.$$

8. The FT-DTC method of claim 1, wherein the FT-DTC method is also suitable for a five-phase permanent-magnet rotating motor drive.

* * * * *